Patented July 2, 1940

2,206,374

UNITED STATES PATENT OFFICE 2,206,374

ART OF SYNTHESIZING COMPOUNDS OF THE ASCORBIC ACID SERIES

Irwin Stone, New York, N. Y., assignor to Wallerstein Company, Inc., New York, N. Y., a corporation of New York No Drawing. Application August 19, 1937, Serial No. 159,913

10 Claims. (Cl. 260—344)

This invention relates to a process for the preparation of osones from aldehyde and ketone alcohols, such as sugars, and to a process of synthesizing compounds of the ascorbic acid series from the osones so produced.

It has previously been proposed to prepare such ascorbic acid compounds by a process one step of which involves adding a cyanide to osones. The process involves two stages: First, the addition of cyanide to the osones with consequent re-arrangement to the imino form, and, second, the hydrolysis of the imino-compounds to the corresponding acids.

A serious objection to such a process and one that has prevented commercial adoption of this synthesis in the production of ascorbic acids has been the lack of a simple and effective method of preparing the osones in a form suitable for use in the manner mentioned.

In such previously known process for synthesizing compounds of the class referred to by means of the cyano-hydrin reaction as applied to the osones, the classic Fischer method for preparing osones was utilized. That is, sugars were treated with excess phenylhydrazine to form the osazones and then these osazones were laboriously hydrolyzed to the osones by strong hydrochloric acid to remove the phenylhydrazine residues. It was then necessary to isolate and purify the osones before succeeding steps in the synthesis could be carried out. This method would be extremely costly, time consuming, troublesome and entirely unsuitable for commercial practice. In addition, it would not be possible to obtain efficient yields of osones by the method referred to.

It is an object of the present invention to provide a process for effectively, economically and simply producing compounds of the ascorbic acid series by synthesis.

More particularly it is an object of the invention to simplify the preparation of osones from their corresponding sugars and to effect the preparation of such osones in such manner that the subsequent complicated, difficult and expensive isolation and purification steps heretofore necessary are avoided.

It is still a further object of the invention to provide a process of preparing osones such that a materially higher yield is obtained than has heretofore been possible.

By the present invention, osones may be produced in a more nearly pure condition and in a more efficient manner than heretofore. Moreover, and what is of particular importance, the osone-containing solutions are substantially free of any impurities that will injuriously affect the subsequent steps of the synthesis. That is, any impurities present with the osones, in the intermediate product, are of such kind and in such quantities as to be inert, insofar as the subsequent steps in the synthesis are concerned. This permits the intermediate product to be used directly without the necessity of isolating and purifying the osones as would always be required in processes heretofore known.

It has been found that when sugars are acted upon by cupric ions in aqueous organic acid solutions, osones are formed as evanescent intermediate oxidation products of the sugars. The complex reactions involved in the oxidation of sugars through the agency of cupric ions are such that, in addition to other oxidation products, the osones during formation are further oxidized and promptly broken down, ultimately being converted into a number of other oxidation products, including formic acid and carbon dioxide.

I have discovered that when the reaction is properly controlled, the course of the reaction is such that a particular point is reached at which there is a maximum or optimum concentration of osones, this point being normally reached at a relatively early stage and before complete reaction of the starting sugar material.

I have also discovered the unexpected result that when the reaction is terminated at or near the point of optimum osone concentration, the reaction products may be used directly in subsequent steps of the synthesis without isolating the osone and without further purification measures other than removal of the unreacted copper.

In carrying out the process of the present invention, I form an intermediate osone-containing product by reacting aldehyde or ketone alcohols, such as sugars, with an organic copper compound capable of yielding a cupric ion, for example, neutral copper acetate or other cupric salts of organic acids, such as the formate. In carrying out the invention in its entirety, I control the temperature throughout the reaction, e. g. by setting up a predetermined temperature prior to the mixing of the copper solution and the sugar material and then maintaining that temperature throughout. I then terminate the reaction after a predetermined time interval so selected that the optimum osone concentration is substantially attained. As stated, this will normally occur at a relatively early stage and prior to complete reaction of the sugar starting material. Such termination may conveniently be effected by precipitating the copper by the addition of a suitable copper-precipitant. For this purpose, I have found oxalic acid suitable and satisfactory but other compounds capable of uniting with copper to form an insoluble copper salt under the conditions of the process may be used, for example, sodium phosphate.

The reaction temperature and duration may vary within fairly wide limits, being varied reciprocally. I have found, for example, that using dextrose as a starting sugar material, a reaction temperature of 45° C. over an interval of 1 to 1½ hours gives suitable and satisfactory results. Higher temperatures may be used but as they accelerate the reaction, temperatures should be avoided which carry the reaction to the point of optimum osone concentration in too short a time interval to permit proper control. Lower temperatures may also be used, their only disadvantage being a slowing up of the reaction and hence a needless loss of time.

One important advantage of maintaining a predetermined reaction temperature is that once the time required to obtain the optimum osone concentration for given starting materials has been determined for a given reaction temperature, such time interval serves as a measure for terminating the reaction in all subsequent batches of like materials.

The requisite time interval for a given set of conditions is readily determined by tests, for example, by analyzing samples taken at 15 minute or other regular intervals to determine the ratio of osone present to the original starting sugar and noting the time interval required to attain maximum osone concentration.

I have discovered a further unexpected result in connection with the preparation of osones as described, namely, that by supplying an ingredient for controlling or regulating the hydrogen-ion concentration of the reaction mixture, it is possible to alter and regulate the course of the reactions beneficially and thereby obtain materially higher yields of osones.

In carrying out the invention to what is now considered the best advantage, therefore, I add to the cupric salt solution, conveniently before addition of the starting sugar, a material capable of controlling or regulating the hydrogen-ion concentration of the solution. For this purpose I have found calcium carbonate (CaCO$_3$) to give satisfactory results. Other otherwise insoluble, inert regulating agents such, for example, as zinc, strontium or barium carbonate will also give good results.

I have demonstrated by comparative tests that when a regulating or controlling agent such as calcium carbonate is used, the maximum yield of osones, measured in terms of percentage of starting material, may be nearly double the yield attained without such agent.

For example, I have made the following comparative tests:

Test I.—40 grams (0.2 mol) of cupric acetate was dissolved in 400 c. c. of water at 45° C. To this solution was added 15 grams (0.1 mol) of d-xylose (C$_5$H$_{10}$O$_5$), the reaction temperature being maintained at 45° C. for about 3 hours. At intervals of 15 minutes, samples were taken and analyzed to determine the ratio of osone present to the original d-xylose employed. This test showed that the maximum yield of osone was about 18% of the original d-xylose and that this yield was attained after an interval of about 2½ hours, the yield commencing to drop off thereafter.

Test II.—This test involved the same materials, proportions, temperature, etc., except that before the addition of d-xylose, there was added to the cupric acetate solution 10 grams (0.1 mol) of calcium carbonate (CaCO$_3$). The periodic analyses showed that the maximum osone yield was about 34% of the d-xylose employed and that this yield was reached in about 1 hour and 20 minutes, after which the yield commenced to drop off.

When the described reaction is carried out and terminated as described, either with or without control of the hydrogen-ion concentration, the resulting osone-containing product is uncontaminated by any substantial amounts of oxidation products capable of interfering with the subsequent reaction. Such osone product, so obtained, contains various amounts of unreacted sugar, together with organic acids and inorganic by-products, but is relatively free of other oxidation products. The entire reaction products, after removal of the copper, may then be utilized as a starting material for the succeeding steps in the synthesis of the ascorbic acids, without the necessity of isolating the osones from the solution. That is to say, the impure product may be used directly without purification.

For example, hydrocyanic acid or a cyanide may be added directly to the unpurified osone-containing reaction mixture after removal of the copper. This converts the osones to the corresponding imino-compounds suitable for ready conversion to corresponding ascorbic acids. Such an imino-compound is readily separated from the accompanying reaction mixture by crystallization. The imino-compound crystallizes readily in an almost pure condition from the coil concentrated reaction mixture and may be filtered out. These relatively pure imino-compounds may they be hydrolyzed with solutions of acid to produce mixtures from which the corresponding pure ascorbic acids may be crystallized out readily and efficiently.

The following detailed example of the synthesis of gluco-ascorbic acid is submitted as further illustrating the invention:

To prepare an imino-compound as an intermediate for the production of the final product: Dissolve 400 grams (2 mols) of neutral copper acetate in 4000 c. c. of warm water of about 35° to 38° C. Add 200 grams (2 mols) of calcium carbonate (CaCO$_3$). Bring the temperature to about 45° C. Add 400 grams (slightly more than 2 mols) of glucose. Maintain at 45° C. for about one hour while stirring continuously. At the end of this time filter quickly by suction. To the filtrate add an aqueous solution of oxalic acid made up of 1000 c. c. of water and 280 grams of oxalic acid. Allow the mixture to stand to permit the formation and deposit of a precipitate. Then filter the solution and evaporate the filtrate in vacuo to a volume of about 500 to 600 c. c. Neutralize this concentrated solution with ammonium hydroxide, using chlor-phenol red as an indicator. Then add 35 grams of sodium cyanide, stir thoroughly, cool and allow to stand for about 10 minutes. Next carefully neutralize with strong acetic acid, using chlor-phenol red as an indicator. Place in a refrigerator and maintain at a temperature of between 1° and 5° C. for a period of about 10 to 12 hours or more. This results in the formation of a precipitate. Filter off the crystals by suction and wash same with ice water and dry. This completes the production of the imino-compound (imino-gluco-ascorbic acid).

After the intermediate imino-compound has been formed, as above described, it is further treated to hydrolyze it and convert it into the desired gluco-ascorbic acid. This may be accomplished as follows:

Heat 4 liters of 20% aqueous solution of acetic acid to about 80° C. Pass into it a stream of carbon dioxide for 2 or 3 minutes to displace dissolved air. Then add 80 grams of the above-mentioned imino-compound to the acetic acid solution and stir until the imino-compound is dissolved. Maintain the temperature at about 80° to 85° C. for 8 hours and then allow the material to cool to room temperature (about 15° to 30° C.) and to stand at this temperature for about 10 or 12 hours. Evaporate the solution in vacuo at a temperature of about 20° to 30° C. until crystallization begins. Then add 500-700 c. c. of ethyl alcohol and set in a refrigerator to cool the solution to about 0° to 5° C. This causes further crystallization. After about 24 hours filter off the crystals by suction, wash same with ethyl alcohol and dry. The final product is gluco-ascorbic acid.

If it is desired to increase the yield, the mother liquor and the washings may be treated by adding to them butyl-alcohol and cooling the mixture to obtain further crystals of gluco-ascorbic acid.

Modifications may be made, if desired, in the detailed procedure just described. The use of other cupric salts, other copper-precipitants and other regulating agents has already been referred to, as has variation in the reaction temperature-time relation. In addition, in hydrolyzing the imino-compound, other acids than acetic may be used, for example, formic, hydrochloric or phosphoric acids.

In the process of making gluco-ascorbic acid above described, glucose was employed as a starting material. The same final product may be obtained if fructose (ketose sugar) be used instead of the glucose (an aldose sugar).

The process above described for glucose and fructose is to be understood as applicable to other sugars. For example, the process can be employed in converting the more commonly occurring sugars, such as d-mannose, d-galactose, d-arabinose and l-rhamnose into their corresponding ascorbic acids. The ascorbic acids derived from d-arabinose and l-rhamnose are anti-scorbutically active and hence desirable on that account. Similarly, the more rarely occurring sugars, such as l-mannose, l-galactose, l-arabinose and d-rhamnose may also be used as starting materials. The ascorbic acids prepared from the first two are anti-scorbutically active.

As further exemplifying the invention, d-xylo-ascorbic acid may be synthesized from d-xylose as follows:

Dissolve 30 grams of copper acetate in 300 c. c. of water at 45° C. To this solution add 15 grams of calcium carbonate and 11.2 grams of d-xylose. The resulting reaction is allowed to proceed for about 1 hour and 15 minutes, the temperature being maintained at about 45° C. Filter the solution and add to the filtrate 20 grams of oxalic acid dissolved in 150 c. c. of hot water at about 80° C. The resultant solution is cooled to a temperature of about 5° C., allowed to stand for about 1 to 2 hours, and again filtered. The filtrate is concentrated to a syrup by distillation in a vacuum at a temperature not exceeding about 35° C., the reduced pressure being about 15-25 m. m. mercury. Add about 10 c. c. of water and 2 grams of sodium cyanide, stirring until the cyanide is dissolved. The cyanide is allowed to react for 10 minutes and then the mixture is neutralized with strong acetic acid, using chlor-phenol red as an indicator. When neutral, the mixture is cooled to about 1° C. for about 24 hours to precipitate out the imino-d-xyloascorbic acid. Filter off the filtrate from the precipitate and wash the latter with a small amount of 70% ethyl alcohol cooled to a temperature of about 5° C.

Further recoveries of the imino-compound may be obtained from the mother liquor and the washings by adding strong ethyl alcohol to separate out a syrup. The alcohol layer is decanted from the layer of syrup and the latter diluted with a small amount of water, say about equal quantities. On cooling this somewhat dilute syrup for about 24 hours, a further yield of imino-d-xylo-ascorbic acid is obtained.

The separated imino-d-xylo-ascorbic acid may be hydrolyzed to d-xylo-ascorbic acid by treatment with acids in the manner above described in connection with the production of gluco-ascorbic acid.

As another example, d-manno-ascorbic acid may be produced by the process steps recited for d-xylo-ascorbic acid, except that 13.8 grams of d-mannose is advisedly used instead of 11.2 grams d-xylose.

What is claimed is:

1. The process of synthesizing compounds of the ascorbic acid series, which comprises acting upon a solution of a sugar with a cupric salt of an organic acid, in the presence of a material for regulating the hydrogen-ion concentration in the acid range, adding a copper-precipitant, removing the resulting copper-precipitate, reacting the solution with a cyanide, recovering the resulting imino-compound in crystalline form, and hydrolyzing said imino-compound to produce the corresponding ascorbic acid.

2. The process of synthesizing compounds of the ascorbic acid series, which comprises acting upon a solution of a sugar with a cupric salt of an organic acid, in the presence of a material for regulating the hydrogen-ion concentration in the acid range, controlling the temperature and duration of such reaction, adding a copper-precipitant, removing the resulting copper-precipitate, reacting the solution with a cyanide, recovering the resulting imino-compound in crystalline form, and hydrolyzing said imino-compound to produce the corresponding ascorbic acid.

3. In a process of preparing useful products from sugars, the steps of converting such sugar starting material into an osone, which comprise reacting said sugar with a cupric salt of an organic acid, in the presence of a water-insoluble carbonate, and controlling the temperature and duration of such reaction.

4. The process of synthesizing compounds of the ascorbic acid series, which comprises acting upon a solution of sugar with a cupric salt of an organic acid, in the presence of a water-insoluble carbonate, maintaining a predetermined reaction temperature for a predetermined interval, then filtering off the solution, treating the solution with a copper-precipitant, filtering the solution, concentrating the filtrate by evaporation, neutralizing the concentrated filtrate, reacting the filtrate with a cyanide, neutralizing the reaction products with an acid, recovering the imino-compound in crystalline form, and hydrolyzing the latter to produce the corresponding ascorbic acid.

5. The process of synthesizing compounds of the ascorbic acid series, which comprises acting upon a solution of sugar with a cupric salt of an organic acid, in the presence of a water-insoluble carbonate, then filtering off the solution, treating the solution with a copper-precipitant, filtering the solution, concentrating the filtrate by evaporation, neutralizing the concentrated filtrate, reacting the filtrate with a cyanide, neutralizing the reaction products with an acid, recovering the imino-compound in crystalline form, and hydrolyzing the latter to produce the corresponding ascorbic acid.

6. The process of synthesizing compounds of the ascorbic acid series, which comprises acting upon a solution of a sugar with a cupric salt of an organic acid, in the presence of a material for regulating the hydrogen-ion concentration in the acid range, terminating the reaction before all said sugar starting material has reacted, by adding a copper precipitant, removing the resulting copper-precipitate, reacting the solution with a cyanide, recovering the resulting imino-compound in crystalline form, and hydrolyzing said imino-compound to produce the corresponding ascorbic acid.

7. The process of synthesizing compounds of the ascorbic acid series, which comprises acting upon a solution of a sugar with a cupric salt of an organic acid, in the presence of a water-insoluble carbonate, controlling the temperature and duration of such reaction, adding a copper-precipitant, removing the resulting copper-precipitate, reacting the solution with a cyanide, recovering the resulting imino-compound in crystalline form, and hydrolyzing said imino-compound to produce the corresponding ascorbic acid.

8. The process of synthesizing compounds of the ascorbic acid series, which comprises acting upon a solution of a sugar with a cupric salt of an organic acid, in the presence of a water soluble carbonate, treating the solution with a copper-precipitant, filtering the solution, concentrating the filtrate by evaporation, neutralizing the concentrated filtrate, reacting the filtrate with a cyanide, neutralizing the reaction products with an acid, recovering the imino-compound in crystalline form, and hydrolyzing the latter to produce the corresponding ascorbic acid.

9. The process of synthesizing gluco-ascorbic acid which comprises acting upon a solution of glucose with a cupric salt of an organic acid in the presence of a material for regulating the hydrogen-ion concentration in the acid range, adding a copper precipitant, removing the resulting copper precipitate, reacting the solution with a cyanide, recovering the resulting imino-gluco-ascorbic acid in crystalline form, and hydrolyzing said imino-gluco-ascorbic acid to produce gluco-ascorbic acid.

10. The process of synthesizing gluco-ascorbic acid which comprises acting upon a solution of glucose with a slightly acidic cupric salt of an organic acid in the presence of an insoluble carbonate, terminating the reaction after a predetermined time by adding a copper precipitant, removing the resulting copper precipitate, reacting the solution with a cyanide, recovering the resulting imino-gluco-ascorbic acid in crystalline form and hydrolyzing said imino-gluco-ascorbic acid to produce gluco-ascorbic acid.

IRWIN STONE.

CERTIFICATE OF CORRECTION.

Patent No. 2,206,374.  July 2, 1940.

IRWIN STONE.

It is hereby certified that error appears in the printed specification of the above numbered patent requiring correction as follows: Page 2, second column, line 39, for the word "coil" read --cold--; line 42, for "they" read --then--; and that the said Letters Patent should be read with this correction therein that the same may conform to the record of the case in the Patent Office.

Signed and sealed this 17th day of September, A. D. 1940.

(Seal)

Henry Van Arsdale,
Acting Commissioner of Patents.